(12) United States Patent
Galland et al.

(10) Patent No.: US 11,919,410 B2
(45) Date of Patent: Mar. 5, 2024

(54) ELECTRICAL CONNECTION MOUNT SYSTEM

(71) Applicant: MARECHAL ELECTRIC, Saint Maurice (FR)

(72) Inventors: Julien Galland, Villeparisis (FR); Romain Pillard, Chartrettes (FR); Francis Zagroun, Neuilly sur Seine (FR)

(73) Assignee: MARECHAL ELECTRIC, Saint Maurice (FR)

( * ) Notice: Subject to any disclaimer, the term of this patent is extended or adjusted under 35 U.S.C. 154(b) by 179 days.

(21) Appl. No.: 17/609,905

(22) PCT Filed: May 12, 2020

(86) PCT No.: PCT/FR2020/050780
§ 371 (c)(1),
(2) Date: Nov. 9, 2021

(87) PCT Pub. No.: WO2020/229768
PCT Pub. Date: Nov. 19, 2020

(65) Prior Publication Data
US 2022/0203850 A1   Jun. 30, 2022

(30) Foreign Application Priority Data
May 13, 2019 (FR) ...................................... 1904938

(51) Int. Cl.
*B60L 53/16* (2019.01)
*H01R 13/62* (2006.01)
(Continued)

(52) U.S. Cl.
CPC .......... *B60L 53/16* (2019.02); *H01R 13/6205* (2013.01); *H01R 13/629* (2013.01); *H01R 13/639* (2013.01)

(58) Field of Classification Search
CPC ... B60L 53/16; H01R 13/6205; H01R 13/629; H01R 13/639; H01R 13/6397;
(Continued)

(56) References Cited

U.S. PATENT DOCUMENTS 3,642,314 A * 2/1972 Smith ................. E05B 65/0811
292/134
5,076,622 A 12/1991 Detweiler
(Continued)

FOREIGN PATENT DOCUMENTS

CN         101250963 A     8/2008
CN         102208290 A     10/2011
(Continued)

OTHER PUBLICATIONS

French Search Report from corresponding French Application No. FR1904938, dated Jan. 23, 2020.
(Continued)

*Primary Examiner* — Thanh Tam T Le
(74) *Attorney, Agent, or Firm* — Workman Nydegger

(57) ABSTRACT

An electrical connection mount system has an electrical connection mount and a controlled locking mechanism configured to lock/unlock a complementary electrical connection mount connected with the electrical connection mount. The locking mechanism includes at least one first lever and one second lever, and an electromagnet. The first lever forms a latch which is movable between a locking position and an unlocking position. The second lever is mechanically coupled to the electromagnet and cooperates with the first lever. Actuation of the electromagnet allows moving the first lever from the locking position to the unlocking position.

10 Claims, 6 Drawing Sheets

(51) Int. Cl.
*H01R 13/629* (2006.01)
*H01R 13/639* (2006.01)

(58) Field of Classification Search
CPC ......... H01R 33/97; E05C 3/045; E05C 3/048; E05B 81/00; E05B 2047/0075; E05B 2047/0078
See application file for complete search history.

(56) References Cited

U.S. PATENT DOCUMENTS

| | | | |
|---|---|---|---|
| 5,224,744 A * | 7/1993 | Michelutti | B65F 1/1615 |
| | | | 292/234 |
| 6,666,485 B1 * | 12/2003 | Moret | B65F 1/1615 |
| | | | 292/130 |
| 8,146,964 B2 | 4/2012 | Spurr | |
| 8,203,088 B2 | 6/2012 | Gottschalk et al. | |
| 8,960,735 B2 * | 2/2015 | Michael | E05C 3/24 |
| | | | 292/216 |
| 9,088,098 B2 | 7/2015 | Hwang | |
| 9,130,324 B2 | 9/2015 | Furuya et al. | |
| 9,929,509 B1 | 3/2018 | Penn et al. | |
| D831,589 S | 10/2018 | Penn et al. | |
| 10,221,010 B2 * | 3/2019 | Reeb | B65F 1/1615 |
| 10,378,252 B2 * | 8/2019 | Ottino | E05B 81/68 |
| 10,483,688 B2 * | 11/2019 | Wrisley | H01R 13/665 |
| 10,900,255 B2 * | 1/2021 | Fink | B65F 1/1615 |
| 10,950,974 B2 * | 3/2021 | Schreiber | H01R 13/516 |
| 11,374,359 B2 * | 6/2022 | Hallberg | H01R 13/6205 |
| 11,396,763 B2 * | 7/2022 | Michael | E05B 65/5292 |
| 11,598,129 B2 * | 3/2023 | Margheritti | E05B 85/26 |
| 2008/0217928 A1 | 9/2008 | Spurr | |
| 2011/0240445 A1 | 10/2011 | Gottschalk et al. | |
| 2013/0224974 A1 | 8/2013 | Furuya et al. | |
| 2014/0020436 A1 * | 1/2014 | Matuschek | E05B 65/52 |
| | | | 70/158 |
| 2014/0170864 A1 | 6/2014 | Hwang | |

FOREIGN PATENT DOCUMENTS

| | | |
|---|---|---|
| CN | 103222118 A | 7/2013 |
| CN | 103872504 A | 6/2014 |
| CN | 105703165 A | 6/2016 |
| CN | 109066191 A | 12/2018 |
| DE | 102010040787 A1 | 3/2012 |

OTHER PUBLICATIONS

International Search Report and Written Opinion from PCT Application No. PCT/FR2020/050780, dated Sep. 4, 2020.
Chinese Office Action for Corresponding Chinese Patent Application No. 202080035086.5, dated Jun. 21, 2023.

* cited by examiner

[Fig. 1]
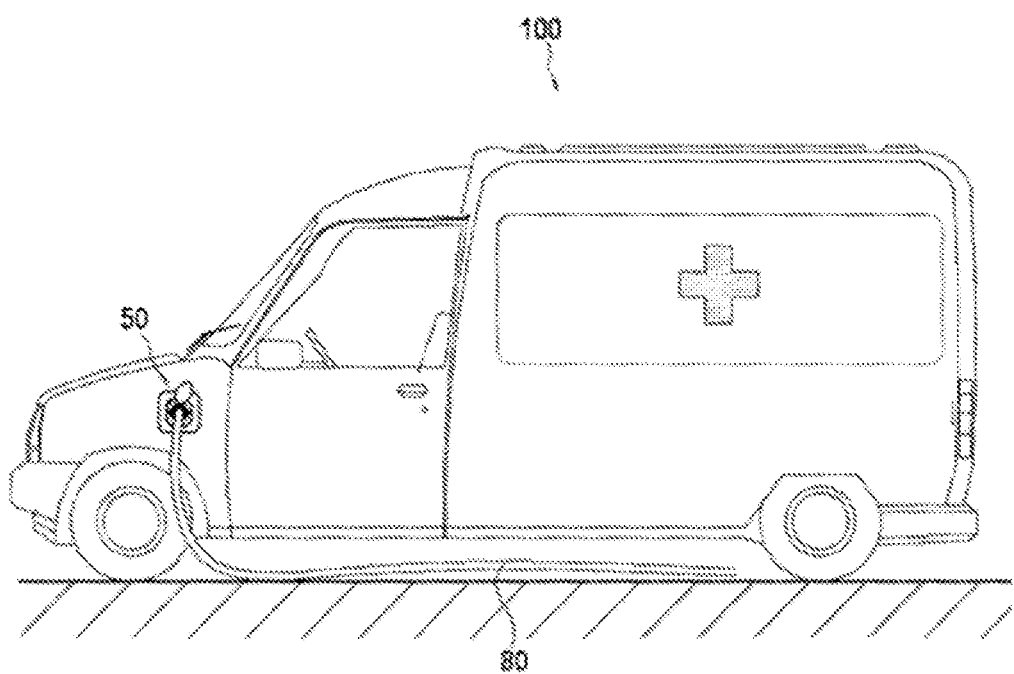

[Fig. 2]
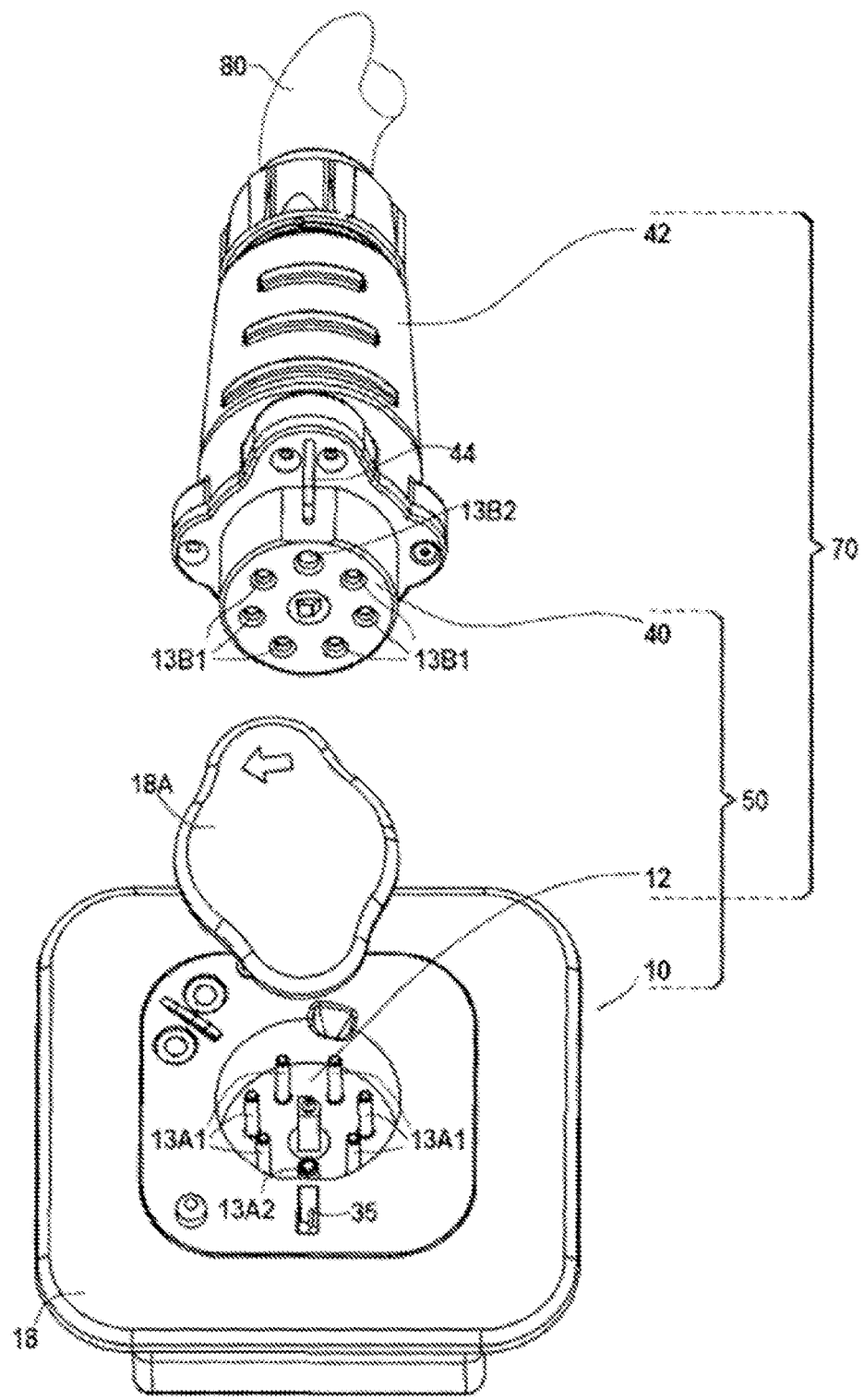

[Fig. 3]
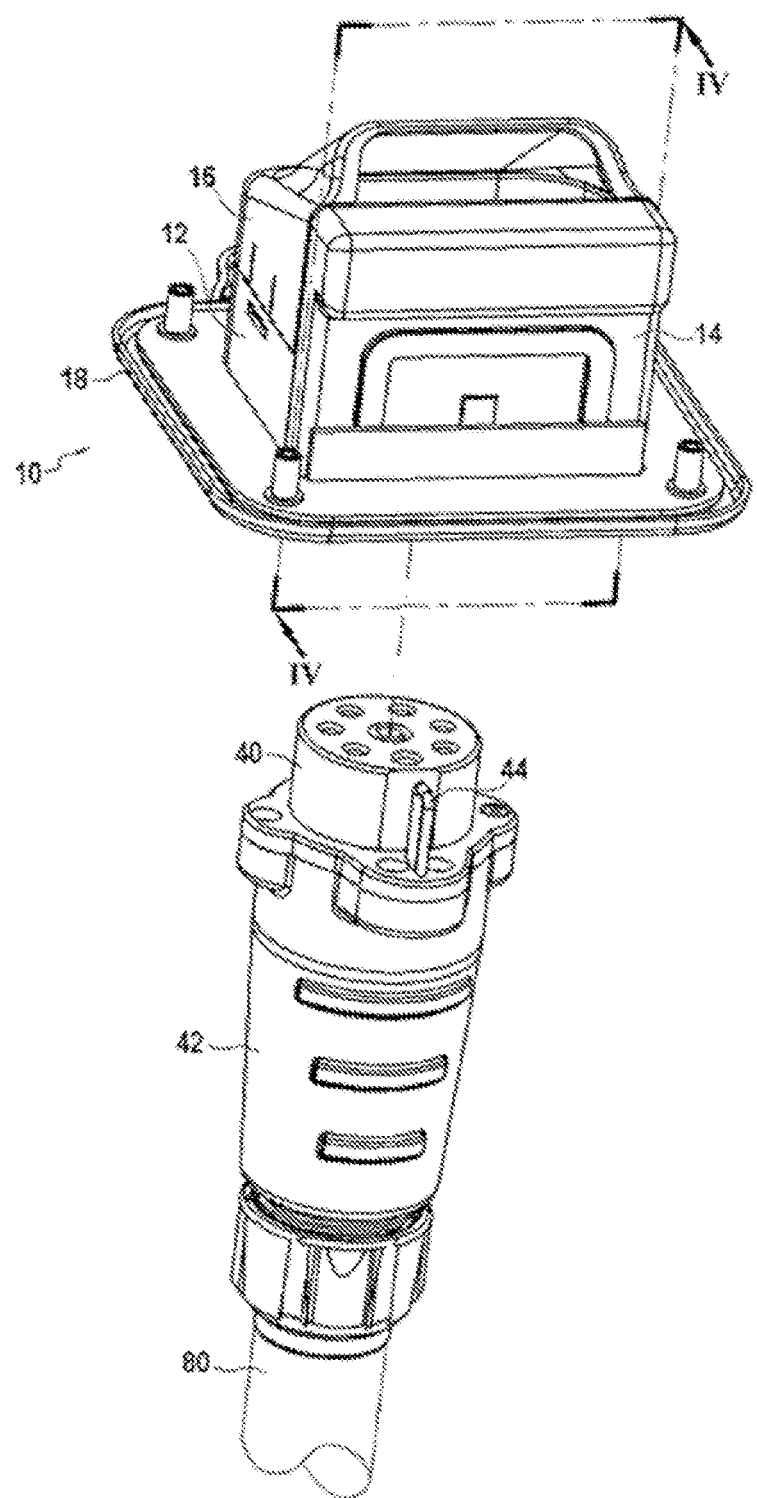

[Fig. 4]
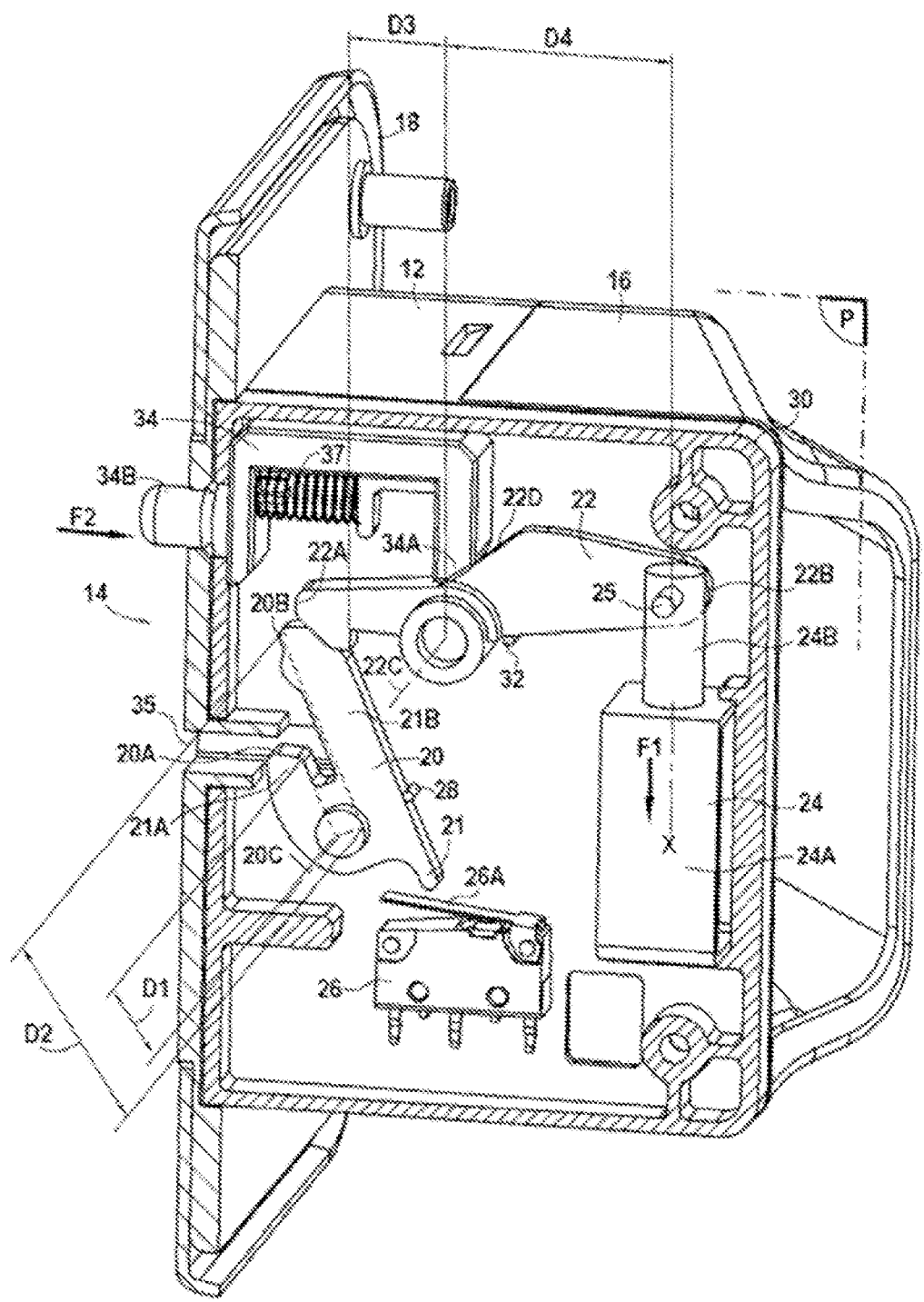

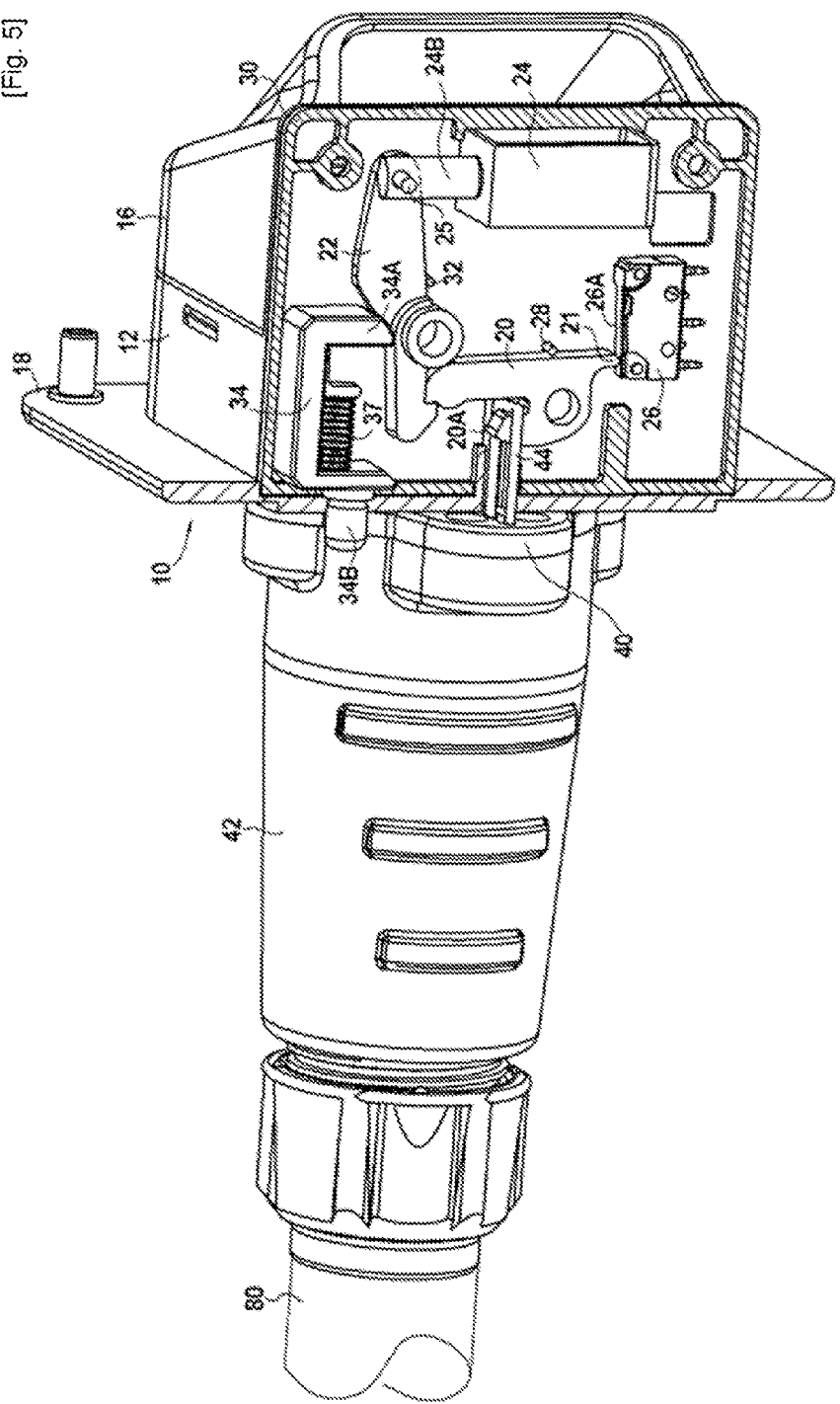

[Fig. 6]
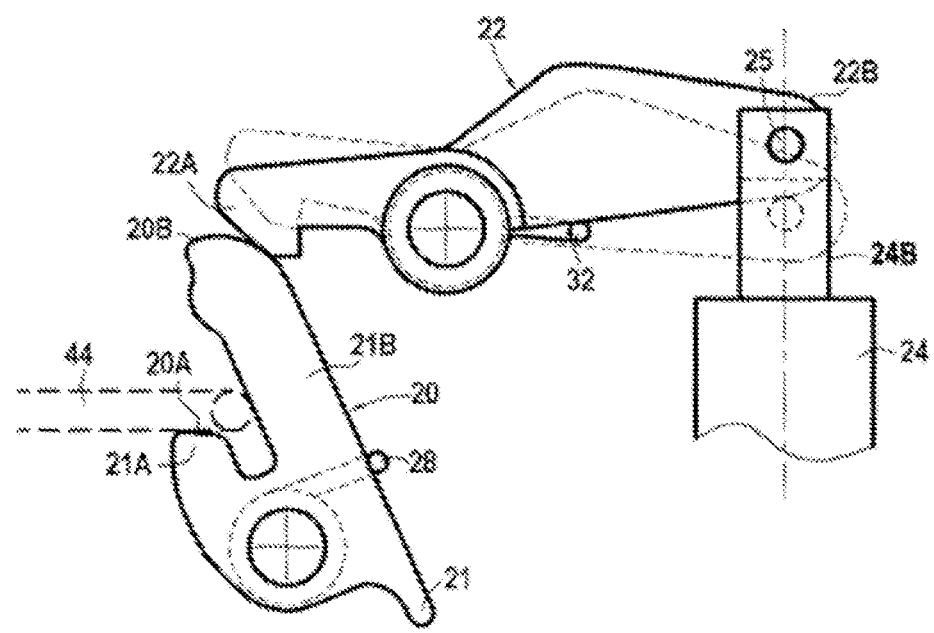

ELECTRICAL CONNECTION MOUNT SYSTEM

TECHNICAL FIELD

The present disclosure relates to an electrical connection mount system comprising an electrical connection mount and a controlled locking mechanism configured to lock/unlock a complementary electrical connection mount connected with the electrical connection mount. The present disclosure also relates to an assembly comprising an electrical connection mount system of this type and a complementary electrical connection mount.

PRIOR ART

Known electrical connection mount systems are generally expensive, have considerable bulk and often have reliability problems. In fact, known system generally have an over-dimensioned electromagnet to ensure acceptable reliability, but on the one hand a design of this type has proven to be costly, while the general bulk is high, and on the other hand it sometimes happens that the electromagnet nevertheless deteriorates after a certain operating time. Therefore, there exists a need in this sense.

DISCLOSURE OF THE INVENTION

One embodiment relates to an electrical connection mount system comprising an electrical connection mount and a controlled locking mechanism configured to lock/unlock a complementary electrical connection mount connected with the electrical connection mount, the locking mechanism comprising at least one first lever and one second lever, and an electromagnet, the first lever forming a latch which is movable between a locking position and an unlocking position, while the second lever is mechanically coupled to the electromagnet and cooperates with the first lever, whereby actuation of the electromagnet allows moving the first lever from the locking position to the unlocking position.

It is understood that the electrical connection mount can be an outlet mount or a connector mount, while the complementary electrical connection mount can be a connector mount or an outlet mount, respectively. Hereafter, and unless otherwise indicated, "mount" means "electrical connection mount," "complementary mount" means complementary electrical connection mount" and "the mounts" means "the electrical connection mount and the complementary electrical connection mount."

Generally, it is recalled that an outlet mount forms a female portion which can belong to an electrical outlet (where the outlet mount is generally secured to a wall, a junction box or the equivalent) while a connector mount forms a male portion which can belong to an electrical outlet (where the connector mount generally forms part of the plug), an extender or a connector (where the connector mount is generally secured to a device, a junction box or the equivalent).

It is also recalled that generally, an outlet comprises an outlet mount and a handle or cowling secured to said outlet mount; a plug comprises a connector mount and a handle or cowling secured to said connector mount; an extender is an assembly comprising an outlet and a plug; an electrical outlet is an assembly comprising an outlet mount and a plug; a connector is an assembly comprising an outlet and a connector mount. Generally, the electrical connection mounts can, in addition to connecting the electrical power lines, allow connecting other lines, such as for example data transfer lines, fluid ducts, for example for gas, etc.

The mounts can be of the "butt contact" type or of the "socket contact" type. A butt contact is a contact where the electrical connection with a complementary contact, a prong for example, is provided by a contact face that is substantially perpendicular to the axial direction. A contact of this type is configured to cooperate in abutment with a complementary face, for example a face of a distal end of a prong, the contact between these two faces generally being accomplished with a certain pressure to guarantee the passage of current from one contact to the other. A socket contact is a contact where the electrical connection with a complementary contact, a prong for example, is provided by a jacket coaxial with the prong.

The system comprises two levers, namely the first lever and the second lever, or more than two levers. The second lever can cooperate directly or indirectly with the first lever. For example, in the case where the system comprises more than two levers, the second lever can cooperate with the first lever by means of one or more other levers. Hereafter, and unless otherwise indicated, what is meant by "the levers" is "the at least one first lever and another lever."

It is understood that the electromagnet allows actuating the second lever, which for its part cooperates with the first lever, whereby the first lever is moved from the locking position to the unlocking position. This allows freeing the complementary mount which was locked due to the first lever. For example, in the case of a butt contact electrical connection, the compression springs of the butt contact allow, when the first lever passes into the unlocking position, to automatically eject the complementary mount of the mount. According to another example, in the case of a socket contact electrical connection, an ejection spring provided for one of the mounts allows, when the first lever passes into the unlocking position, automatically ejecting the complementary mount of the mount. For example, the actuation of the electromagnet only allows moving the first lever from the locking position to the unlocking position. This allows further simplifying the system and reinforcing its durability.

For example, this electrical connection mount system is mounted on a vehicle to allow electrical power supply to various electrical devices of the vehicle, particularly when the vehicle is stopped. The electromagnet is for example coupled to the starter and/or to the brake of the vehicle. Thus, when the vehicle is started, the first lever is actuated, whereby the possible complementary mount connected to the mount is ejected during the starting of the vehicle, and the vehicle can depart without risk of damaging the electrical power supply line.

For example, the electrical connection mount system forms an electrically controlled system or a remotely (electrically) controlled system.

The structure with two levers allows managing relatively large forces, while having an electromagnet with a modest size/power. In addition, it is possible to more easily provide adequate dimensioning, including the risks of large forces, of an electromagnet of a more modest size/power than a large electromagnet, while controlling the costs of production. An electrical connection mount system of this type is therefore less costly, of smaller bulk, and reliable.

In certain embodiments, the locking mechanism comprises a circuit breaker configured to cut an electrical power supply circuit of the electromagnet when the first lever is in the unlocking position and to connect the electromagnet to the electrical power supply circuit when the first lever is in the locking position.

A circuit breaker is a device designed to open or to close an electrical circuit, and the movable contact element(s) of which have only one rest position. In this example, in the rest position, the circuit breaker is configured to open the electrical power supply circuit of the electromagnet.

A circuit breaker of this type allows making the locking mechanism reliable by avoiding having the electromagnet loaded unnecessarily, for example when the first lever is in the unlocking position. For example, when the system is mounted on a vehicle and it is coupled to the brake of the vehicle, the electromagnet is loaded each time the driver operates the brake of the vehicle. This loads the electromagnet unnecessarily, which is a source of breakdowns and/or deterioration of the electromagnet. Because of the circuit breaker, when the first lever is in the unlocking position, the electrical power supply to the electromagnet is cut off so that the latter is loaded only when that is necessary, i.e. when the first lever is in the locking position, i.e. when a complementary mount is locked with the mount. It can be considered that the circuit breaker forms a position sensor for the first lever.

In certain embodiments, the second lever has a distal end forming a hook and configured to cooperate with the first lever in the locking position, the second lever being movable between a hooking position in which it is configured to block the first lever in the locking position, and a liberation position in which it is configured to free the first lever.

For example, when the system has only one first and one second lever, when a complementary mount is connected to the mount, the first lever is move from the unlocking position to the locking position while it is engaged simultaneously and directly with the hook of the second lever, which is then in the hooking position. When the system has more than two levers, it is understood that the second lever indirectly hooks/frees the first lever, by means of one or more other levers. Such a structure is robust, reliable, and has little bulk, while being less expensive.

In certain embodiments, the first lever and the second lever are movable in the same plane.

A configuration of this type allows a further reduction in general bulk.

In certain embodiments, the electromagnet extends in said plane.

For example, the electromagnet has a coil, the axis of this coil extending in said plane. A configuration of this type allows further reducing the general bulk.

In certain embodiments, the first lever has a first distal end configured to cooperate with a complementary electrical connection mount, a second distal end configured to cooperate with the second lever, and a first axis of rotation, the distance D1 between the first distal end and the first axis of rotation being smaller than the distance D2 between the second distal end and the first axis of rotation, and in which the second lever has a third distal end configured to cooperate with the second distal end of the first lever, a fourth distal end coupled with the electromagnet, and a second axis of rotation, the distance D3 between the third distal end and the second axis of rotation being smaller than the distance D4 between the fourth distal end and the second axis of rotation.

It is understood that the axis of rotation of each lever is distant from the distal ends of said lever. A configuration of this type allows providing a chain of force transmission that allows reducing the size/power of the electromagnet. This allows both reducing the costs of manufacture and the bulk, while allowing the system to be made reliable.

In certain embodiments, 2×D1<D2, for example 3×D1<D2, while 2×D3<D4.

Such ratios allow further reductions of the size/power of the electromagnet and therefore the costs of manufacture and bulk, will allowing the system to be made reliable.

In certain embodiments, the locking mechanism comprises a first return element configured to return the first lever from the locking position to the unlocking position.

For example, the first return element is a spring, for example a torsion spring mounted around the first axis of rotation. The first return element allows retaining by default the first lever in the unlocking position, which participates in ensuring the reliability of the system. This facilitates the ejection of the complementary mount, and allows automatically positioning the first lever in the unlocking position, ready to cooperate with a new complementary mount.

In certain embodiments, the second lever is movable between a hooking position in which it is configured to block the first lever in the locking position and a liberation position in which it is configured to free the first lever, the locking mechanism comprising a second return element configured to return the second lever from the liberation position to the hooking position.

For example, the second element is a spring, for example a torsion spring mounted around the second axis of rotation. The second return element allows retaining by default the second lever in the hooking position, which participates in ensuring the reliability of the system. Indeed, the second lever thus forms a ratchet which is configured to hook the first lever by default. The action of the electromagnet allows moving the second lever to the liberation position while the second return element returns the second lever into the hooking position after the action of the electromagnet. Thus, there is no need for any contribution of energy so that the second lever blocks the first lever in the locking position.

In certain embodiments, the electromagnet has a duty factor less than or equal to 10%.

The duty factor FM (in %) corresponds to a ratio between the effective maximum total duration of power supply (i.e. of being powered on) of the electromagnet (Du) to a reference duration (Dt) at +35° C. Dt is a reference duration specific to each electromagnet, which is generally comprised between 2 min and 5 min. In other words, FM=Du/DT×100.

The locking mechanism according to the present disclosure allows reliable utilization of an electromagnet of this type. An electromagnet having a duty factor less than or equal to 10% has a smaller bulk than an electromagnet having a greater duty factor.

In certain embodiments, the locking mechanism comprises a manual mechanical unlocking control configured to move the first lever from the locking position to the unlocking position.

The manual control allows unlocking manually, i.e. without actuating the electromagnet, a possible complementary mount connected to the mount. For example, the electrical connection mount system forms an electrical/manual control system. The manual control can cooperate directly or indirectly with the first lever, for example via the second lever. This allows avoiding actuating the electromagnet to withdraw a possible complementary mount connected to the mount, for example when the vehicle is stopped. Loading the electromagnet unnecessarily is thereby avoided, which participates in making the system reliable.

One embodiment also relates to an assembly comprising an electrical connection mount system according to any one of the embodiments described in the present disclosure, and a complementary electrical connection mount, the complementary electrical connection mount comprising a locking element configured to cooperate with the first lever when the complementary electrical connection mount is connected with the electrical connection mount in order to lock the connection between the complementary electrical connection mount and the electrical connection mount.

It is understood that the locking element engages with the first lever forming a ratchet when the complementary mount is connected with the mount. For example, the complementary mount and the mount form a connector or an electrical outlet, the complementary mount being movable and assembled with a handle while the while the mount is assembled on a junction box within the electrical connection mount system, the junction box being for example mounted on a vehicle.

BRIEF DESCRIPTION OF THE DRAWINGS

The object of the present disclosure and its advantages will be better understood upon reading the detailed description made hereafter of different embodiments given by way of non-limiting examples. This description refers to the appended pages of figures, in which:

FIG. 1 shows a vehicle equipped with an assembly comprising an electrical connection mount system and a complementary electrical connection mount, connected together, FIG. 2 shows the assembly, disconnected, FIG. 3 shows the disconnected assembly, the mounts approaching to be connected, FIG. 4 shows a section view in the plane IV of FIG. 3 of the locking mechanism, the first lever being in the unlocked position, FIG. 5 a section view in the plane IV of FIG. 3 where the complementary electrical connection mount is connected to the electrical connection mount, the first lever being in the locked position, and FIG. 6 shows the engagement of the first lever with the second lever.

DESCRIPTION OF THE EMBODIMENTS

FIG. 1 shows a vehicle 100 equipped with an assembly 50, shown in more detail in FIG. 2, comprising an electrical connection mount system 10 having an electrical connection mount 12, and a complementary electrical connection mount 40. In FIG. 1, the complementary mount 40 is connected to the mount 12. In this example, the complementary mount 40 is an outlet mount and is equipped with a handle 42, while the connection mount 12 is a connector mount. Thus, in this example, the complementary mount 40, the handle 42 and the mount 12 form a connector 70. The vehicle 100 is supplied with electrical power by the cable 80 via the assembly 50.

FIGS. 2 and 3 show the assembly 50 in perspective in a disconnected position. The outlet mount 40 is a butt contact outlet mount and has a locking element 44 configured to cooperate with the connector mount system 10 so as to lock the connection between the outlet mount 40 and the connector mount 12. The connector mount system 10 comprises the connector mount 12, which is a butt contact connector mount, and a controlled locking mechanism 14. It is noted that, in this example, in addition to having couplers 13A1/13B1 of electric power lines, the mounts also have pneumatic couplers 13A2/13B2 for gas under pressure. The presence of other couplers, electrical/electronic for example, to allow coupling other lines, such as for example data transfer lines, can also be contemplated. The mechanism 14 is configured to lock/unlock the outlet mount 40 when it is connected with the connector mount 12. In this example, the mechanism 14 cooperates with the locking element 44 of the outlet mount 40. In this example, the system 10 comprises a cowl 16 configured to protect the electrical couplings with the connector mount 12, and a front face 18. In this example, the connector mount 12, the cowl 16 and the locking mechanism 14 are assembled together with one another. The front 18 is assembled with the connector mount 12 and with the locking mechanism 14, and serves for mounting the system 10 on a frame, for example the vehicle 100. It is noted that the front 18 has a protective cowl 18A, which allows protecting the plugs of the connector mount 12 when no outlet mount is connected.

FIG. 4 shows in more detail the locking mechanism 14. The mechanism 14 has a first lever 20, a second lever 22, an electromagnet 24 and a circuit breaker 26. In this example, the first lever 20 and the second lever 22 are movable in the same plane P while the electromagnet 24, and more particularly in this example the axis X of the coil 24A of the electromagnet 24, extend in the plane P.

The first lever 20 forms a ratchet that is movable between one, locking, position (see FIG. 5) and an unlocking position (see FIG. 4). The first lever 20 has a first distal end 20A configured to cooperate with an outlet mount 40, for example with the locking element 44, and a second distal end 20B configured to cooperate with the second lever 22. The first lever 20 has a first axis of rotation 20C around which the first lever 20 pivots. In this example, the first distal end 20A and the second distal end 20B are arranged on the same side with respect to the first axis of rotation 20C. In this example, the first lever 20 has substantially a "U" shape, the axis of rotation 20C being arranged in the base of the "U" shape. The "U" shape has a first arm 21A having the first distal end 20A and a second arm 21B having the second distal end 20B. Any other shape of the lever can be contemplated for the first lever 20.

In this example, the distance D1 between the first distal end 20A and the first axis of rotation 20C is smaller than the distance D2 between the second distal end 20B and the first axis of rotation 20C. In this example, D2 is greater than three times D1. More precisely, in this example D1=8.5 mm and D2=32.5 mm.

The first lever 20 has a lug 21 configured to cooperate with a strip 26A of the circuit breaker 26, whereby the circuit breaker 26 cuts the electric power supply circuit (not shown) of the electromagnet 24 when the first lever 20 is in the unlocking position and closes the electric power supply circuit of the electromagnet 24 when the first lever 20 is in its locking position. In this example, the lug 21 presses on the strip 26A in the locking position and does not press on the strip 26A in the unlocking position. In other words, in the resting position, the circuit breaker 26 is configured to open the electric power supply circuit of the electromagnet 24.

The first lever 20 is mounted on a first return element 28, a torsion spring 28 in this example, one end of which cooperates with a casing 30 and one end cooperates with the lever 20 (also see FIG. 6). The first return element 28 tends to return the first lever 20 from the locking position to the unlocking position.

The second lever 22 has a third distal end 22A forming a hook and configured to cooperate with the first lever 20 in the locking position, in this example with the first distal end 20A of the first lever 20. The second lever 22 is movable between a hooking position (FIGS. 4 and 5, position in a continuous line in FIG. 6) in which it is configured to block the first lever 20 in the locking position and a liberation position (position in a dashed line in FIG. 6) in which it is configured to free the first lever 20. In this example, the first lever 20 and the second lever 22 cooperate directly.

The second lever 22 has a fourth distal end 22B coupled with the electromagnet 24. The second lever 22 has a second axis of rotation 22C around which the second lever 22 pivots. In this example, the third distal end 22A and the fourth distal end 22B are arranged opposite to one another with respect to the second axis of rotation 22C. In this example, the second lever 22 has a substantially rectilinear shape. Any other shape of the lever can be contemplated for the second lever 22.

In this example, the distance D3 between the third distal end 22A and the second axis of rotation 22C is smaller than the distance D4 between the fourth distal end 22B and the second axis of rotation 22C. In this example, D4 is greater than two times D3. More precisely, in this example D3=11.5 mm and D4=27.1 mm.

The second lever 22 is mounted on a second return element 32, in this example a torsion spring 32, of which one end cooperates with the casing 30 and one end cooperates with the lever 22. The second return element 32 tends to return the second lever 22 from the liberation position to the hooking position.

The electromagnet 24 has a coil 24A with axis X and a sliding rod 24B extending partially within the coil 24A and coupled via a prong 25 with the fourth distal end 22B of the second lever 22. When the electromagnet 24 is activated, i.e. when it is supplied with electrical power, the rod 24B is moved, in this example the rod 24A is pulled toward the interior of the coil 24B along arrow F1 (see FIG. 4), along the axis X. This has the effect of pivoting the second lever 22, whereby the second lever 22 passes from the hooking position to the liberation position, which consequently liberates the first lever 20 when it is in the locking position. In this example, the electromagnet 24 has a duty factor of 6%.

The locking mechanism 14 comprises a manual mechanical unlocking control 34, in this example a push-button 34. The push-button 34 has a cam 34A configured to cooperate with a cam surface 22D of the second lever 22. Thus, when the push-button 34 is pushed manually via the button 34B along the arrow F2 (see FIG. 4), the cam 34A presses against the cam surface 22D, which has the effect of moving the second lever 22 from the hooking position to the liberation position, consequently freeing the first lever 20 when it is in the locking position. It is thus possible to move the first lever 20 from the locking position to the unlocking position. A return spring 37 allows returning the push-button 34 into its initial position, namely the position where the cam 34A allows the second lever 22 to remain in the hooking position.

During the connection of the connector mount 12 with the outlet mount 40, the locking element 44 engages with the first lever 20. In this example, the first lever 20, which is by default in the unlocking position because of the first return element 28, has the "U" shaped opening oriented toward the insertion orifice 35 of the casing 30 configured to receive the locking element 44. Thus, during the insertion of the locking element 44, the latter engages within the "U" of the first lever 20, and presses the second arm 20B while the first arm 20A engages with the locking element 44. This is shown in FIG. 6. The first lever 20 thus passes from the unlocking position to the locking position, in which the first lever 20 locks the outlet mount 40 in connection with the connector mount 12. In this example, the first arm 21A cooperates with the locking element 44, and is engaged in the loop formed by the locking element 44 so as to block the locking element 44, and therefore the outlet mount 40.

When passing from the unlocking position to the locking position, the second distal end 20B of the first lever 20 cooperates with the third distal end 22A of the second lever 22, which is pushed from the hooking position to the liberation position (position in a dashed line in FIG. 6), whereby the second end 20B engages with the third end 22A. The latter forming a hook, it hooks the second distal end 20B when returning to the hooking position, its default position due to the return element 32. This configuration is shown in FIG. 5.

The first lever 20 is thus held in the locking position by the second lever 22. In this position, the lug 21 presses on the strip 26A of the circuit breaker 26, whereby the electrical power supply circuit of the electromagnet 24 is closed. It therefore becomes possible to actuate the electromagnet 24.

According to a first example, to unlock the outlet mount 40, the electromagnet 24 is actuated, i.e. it is supplied with electrical power, for example when the vehicle 100 is started. The rod 24B then pulls on the second lever 22, which passes into the liberation position, which has the effect of freeing the first lever 20. The locking element 44 is then no longer locked by the first lever 20, the outlet mount 40 is ejected from the connector mount 12 due to the springs, not shown, of the butt contacts. The element 44 thus disengages from the first lever 20, and the latter is returned into the unlocking position by the return element 28. The lug 21 then ceases to cooperate with the strip 26A of the circuit breaker 26, the latter thus cutting the electrical power supply of the electromagnet 24. The rod 24B becomes free to move in the axial direction X, and the second return element 32 returns the second lever 22 into the hooking position. This configuration is shown in FIG. 4.

According to a second example, to unlock the outlet mount 40, manual control 34 is actuated, i.e. the button 34B is manually pressed. This has the effect of moving the second lever 22 into the liberation position. Then, in a similar manner to what has been described in the scope of the first example, the first lever 20 returns into the unlocking position and the outlet mount 40 is ejected. When the pressure exerted on the button 34B is released, the latter returns into its initial position due to the spring 37 and the second lever 22 returns into the hooking position due to the second return element 32.

Although the present invention has been described by referring to specific embodiments, it is obvious that modifications and changes can be carried out on these examples without departing from the general scope of the invention as defined by the claims. In particular, individual features of the different embodiments illustrated/mentioned can be combined into additional embodiments. Consequently, the description and the drawings must be considered in an illustrative, rather than a restrictive sense.

For example, the electrical connection mount 12 can be an outlet mount instead of a connector mount, while the complementary electrical connection mount 40 can be a connector mount instead of an outlet mount. According to another example, the mounts can be of the socket contact types rather than butt contact types.

The invention claimed is:

1. An electrical connection mount system comprising an electrical connection mount and a controlled locking mechanism configured to lock/unlock a complementary electrical connection mount connected with the electrical connection mount, the locking mechanism comprising at least one first lever and one second lever, and an electromagnet, the first lever forming a latch which is movable between a locking position and an unlocking position, while the second lever is mechanically coupled to the electromagnet and cooperates with the first lever, wherein an actuation of the electromagnet allows moving the first lever from the locking position to the unlocking position, and wherein the locking mechanism comprises a circuit breaker configured to cut an electrical power supply circuit of the electromagnet when the first lever is in the unlocking position and to connect the electromagnet to the electrical power supply circuit when the first lever is in the locking position.

2. The electrical connection mount system according to claim 1, wherein the actuation of the electromagnet only allows moving the first lever from the locking position to the unlocking position.

3. The electrical connection mount system according to claim 1, wherein the second lever has a distal end forming a hook and configured to cooperate with the first lever in the locking position, the second lever being movable between a hooking position in which the second lever is configured to block the first lever in the locking position, and a liberation position wherein the second lever is configured to free the first lever.

4. The electrical connection mount system according to claim 1, wherein the first lever has a first distal end configured to cooperate with the complementary electrical connection mount, a second distal end configured to cooperate with the second lever, and a first axis of rotation, a distance D1 between the first distal end and the first axis of rotation being smaller than a distance D2 between the second distal end and the first axis of rotation, and wherein the second lever has a third distal end configured to cooperate with the second distal end of the first lever, a fourth distal end coupled with the electromagnet, and a second axis of rotation, a distance D3 between the third distal end and the second axis of rotation being smaller than a distance D4 between the fourth distal end and the second axis of rotation.

5. The electrical connection mount system according to claim 4, wherein 2×D1<D2.

6. The electrical connection mount system according to claim 1, wherein the locking mechanism comprises a first return element configured to return the first lever from the locking position to the unlocking position.

7. The electrical connection mount system according to claim 1, wherein the second lever is movable between a hooking position in which the second lever is configured to block the first lever in the locking position and a liberation position in which the second lever is configured to free the first lever, the locking mechanism comprising a second return element configured to return the second lever from the liberation position to the hooking position.

8. The electrical connection mount system according to claim 1, wherein the electromagnet has a duty factor less than or equal to 10%.

9. The electrical connection mount system according to claim 1, wherein the locking mechanism comprises a manual mechanical unlocking control configured to move the first lever from the locking position to the unlocking position.

10. An assembly comprising an electrical connection mount system according to claim 1, and the complementary electrical connection mount, the complementary electrical connection mount comprising a locking element configured to cooperate with the first lever when the complementary electrical connection mount is connected with the electrical connection mount in order to lock the connection between the complementary electrical connection mount and the electrical connection mount.

* * * * *